Nov. 8, 1927.　　　　　　　　　　　　　　　　　　　1,648,278
W. F. LAUTENSCHLAGER
LIGHT DETECTOR FOR AUTOMOBILES AND THE LIKE
Filed June 17, 1925
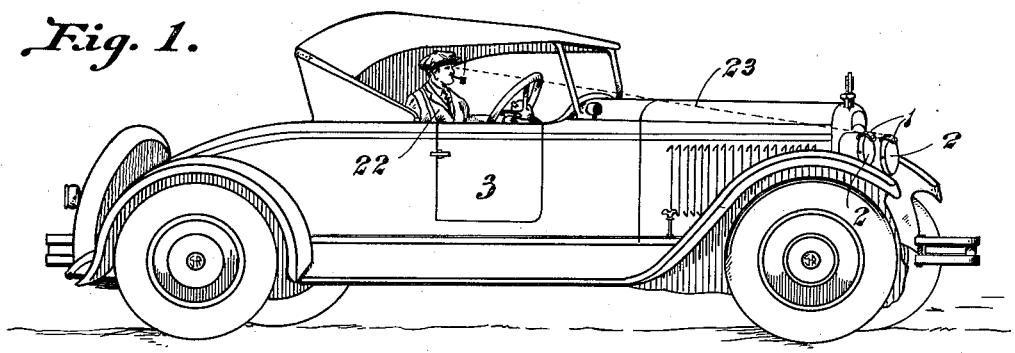
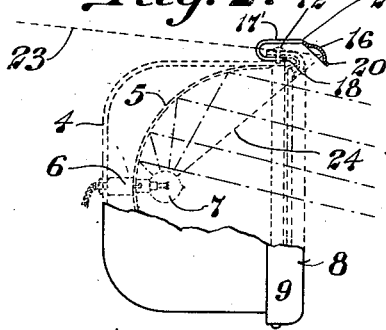
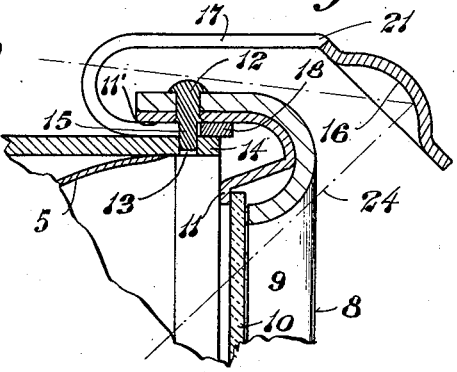
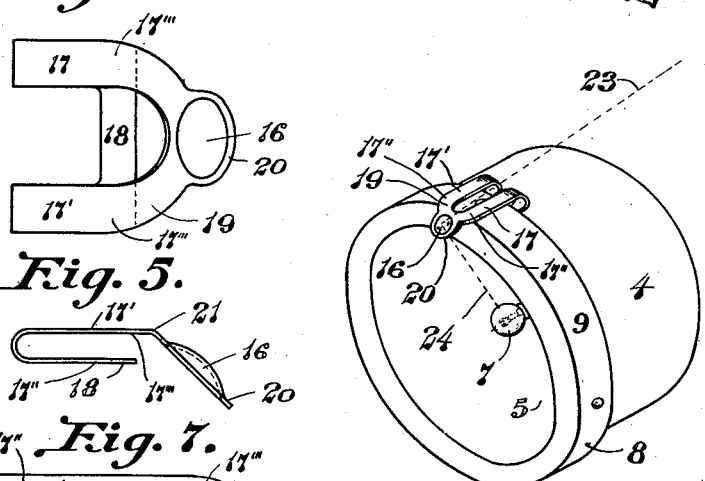
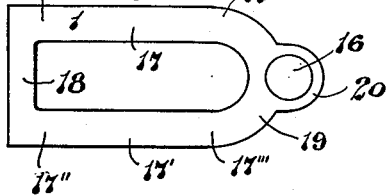
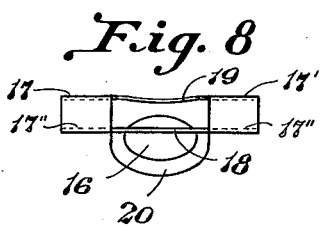
INVENTOR.
William F. Lautenschlager
BY James V. Ramsey
ATTORNEY.

Patented Nov. 8, 1927.

1,648,278

UNITED STATES PATENT OFFICE.

WILLIAM F. LAUTENSCHLAGER, OF CINCINNATI, OHIO.

LIGHT DETECTOR FOR AUTOMOBILES AND THE LIKE.

Application filed June 17, 1925. Serial No. 37,725.

My invention relates to an attachment for vehicle lights such as are used on automobiles, buses, trucks, and the like.

The vehicles named and numerous others are required by law to have two lights in front as well as one in the rear when travelling at night. Frequently during the course of travel one or both of the electric bulbs may become inoperative, or as more generally termed "burned out." It is not very likely, however, that both bulbs would burn out at the same time. Should one of the front lights burn out, when driving at night, it is rather difficult to detect this from the driver's seat. This is especially so when driving with the dim lights burning, or in the rain, or on wet or oiled streets.

The objects of my invention are to provide a simple, efficient, economical and practical light detector or indicator adapted to be used on all types of motor vehicles required by law to burn lights at night.

Another object of the invention is that should a light burn out while operating a vehicle having my light indicator installed thereon the driver can detect it immediately without leaving the driver's seat.

A further object of my invention is to protect motorists and drivers of buses and like vehicles from unconsciously violating the law by operating said vehicles without the amount of light required by law.

My invention consists in providing a light detector preferably made of thin sheet metal and adapted to be installed on numerous vehicle lights and having a bulged portion which is polished and adapted to reflect the light rays from lights on the vehicle so as to indicate to the driver whether the lights are burning or not without leaving his seat or stopping.

My invention further consists in the construction, combination and arrangement of parts, as herein set forth and claimed.

In the drawing:

Fig. 1 is a side elevation of a motor vehicle having my invention installed on the front lights;

Fig. 2 is a side elevation of an electric light for motor vehicles, shown partly in vertical section by dotted lines with the detector installed thereon which is shown in vertical section by full lines;

Fig. 3 is an enlarged fragmental vertical section of the electric light casing and my improved light indicator or detector mounted thereon;

Fig. 4 is a plan view of the detector itself;

Fig. 5 is a side elevation of the same;

Fig. 6 is a front perspective view of a motor vehicle light with the detector installed thereon;

Fig. 7 is a plan view of the detector in the blank form; and

Fig. 8 is a rear elevation of the detector ready to be installed.

In the preferred construction of my invention I provide light indicator or detector 1 which is adapted to be installed on lights 2 of motor vehicle 3 or like conveyance. The usual and most common motor vehicle light comprises lamp casing or shell 4, reflector 5, bulb socket 6, bulb 7 and door 8. The front of said casing 4 is closed by door 8 which comprises door rim 9, lens 10, lens retaining member 11 which is secured to said rim 9 by shoulder rivets 12. Casing 4 has spaced apart bayonet slots 13 positioned around the outer edge 14 for the purpose of receiving the reduced end 15 or rivets 12.

To describe my improved light detector 1, I will start with its blank form, as shown in Fig. 7, the contour of which may be stamped out by a die. The die may also be made to form a bulge or concaved portion 16 at the same time it performs the stamping operation. The next step is to bend the parallel spaced apart sides 17 and 17' so that the ends 17'' connected together by strap 18 are spaced apart and beneath the sides 17 substantially as shown in all of the figures except Fig. 7.

The other ends 17''' of sides 17 are joined by semi-circular portion 19 which has extended portion 20 in which the bulge or concave 16 is made. Said semi-circular portion 19 is bent downwardly at 21 to approximately a 45° angle for the reasons hereinafter more fully described.

To install my light detector 1 upon one of the lights 2, remove the door 8 by pressing inward against rim 9 and twist said rim in a counter-clockwise direction which disengages the ends 15 of rivets 12 from bayonet slots 13 in casing 4 whereby the door 8 may be removed. Then place the ends 17'' directly beneath the inner side 11' of lens retaining member 11 so that strap 18 is behind the end 15 of rivet 12. Then insert the ends 15 of rivets 12 in bayonet slots 13 and twist the rim 9 and light detector 1 in a clockwise direction which firmly holds said light detector 1 between the inner side 11' of lens retaining member 11 and outer edge 14 of casing 4. The main purpose of strap 18, located behind end 15 of rivet 12 is to prevent the light detector 1 from being removed accidentally or intentionally without removing the door 8.

An advantage of the invention is that when seated in a vehicle (such as automobile 3) the driver 22 of said vehicle has a clear view (as represented by dotted line 23) to the concaved portion 16. Said concave portion may be highly polished so as to reflect the light rays 24 from bulb 7 and reflector 5, thereby indicating to the driver that his bulb is burning without the necessity of getting out of the machine as is the case at the present time.

Another advantage of this invention is that it can be attached to automobile lamps as now constructed without any change in the lamps or without any extraneous fastening means.

Thus I have invented a simple and highly desirable article of manufacture, as illustrated in the drawing and referred to in the above description as the preferred embodiment. It is most efficient and practical, yet, realizing that the conditions incident with the adoption of my invention will necessarily vary, I desire to emphasize the fact that while I have chosen to illustrate the form and construction of my invention by the accompanying drawings and explanations of the same, the form and explanations, relating thereto, are not intended to include all of the structures in which my invention may be incorporated. It is understood that my invention resides in the combination, arrangement and location of parts, and in the details of construction as hereinafter claimed and that changes in the precise embodiment of the invention can be made within the scope of what is claimed without departing from the spirit of the invention.

What I claim as new and desire to secure by Letters Patent is:

In combination with a vehicle lamp of the class described, a light detector comprising a thin metal slotted plate having its side members connected at one end by an integral holding bar and having the other end connected by a circular concaved or dished reflector extending downwardly at an oblique angle to said plate whereby light may be reflected rearwardly through said slot and fastening means extending through said slot whereby said detector is adjustably mounted, substantially as and for the purposes specified.

WILLIAM F. LAUTENSCHLAGER.